US010291632B2

(12) United States Patent
Zheng et al.

(10) Patent No.: US 10,291,632 B2
(45) Date of Patent: May 14, 2019

(54) FILTERING OF METADATA SIGNATURES

(71) Applicant: Fortinet, Inc., Sunnyvale, CA (US)

(72) Inventors: Juneng Zheng, Fremont, CA (US); Hongbin Lu, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 511 days.

(21) Appl. No.: 15/086,213

(22) Filed: Mar. 31, 2016

(65) Prior Publication Data

US 2017/0289180 A1 Oct. 5, 2017

(51) Int. Cl.
*H04L 29/06* (2006.01)

(52) U.S. Cl.
CPC .............. *H04L 63/1416* (2013.01)

(58) Field of Classification Search
None
See application file for complete search history.

(56) References Cited

U.S. PATENT DOCUMENTS

| | | | | |
|---|---|---|---|---|
| 2005/0234915 A1* | 10/2005 | Ricciulli | ............. | H04L 47/2441 |
| 2008/0219181 A1* | 9/2008 | Kodialam | ............... | H04L 41/14 370/252 |
| 2012/0206279 A1* | 8/2012 | Artan | ................ | G06F 17/30949 341/51 |
| 2014/0325653 A1* | 10/2014 | Altman | ............... | H04L 63/1416 726/23 |
| 2015/0003237 A1* | 1/2015 | Guerra | .................. | H04L 45/745 370/230 |
| 2017/0257347 A1* | 9/2017 | Yan | ........................ | H04L 63/145 |

OTHER PUBLICATIONS

Sarang Dharmapurikar, Praveen Krishnamurthy, T. S. Sproull and J. W. Lockwood, "Deep packet inspection using parallel bloom filters," in IEEE Micro, vol. 24, No. 1, pp. 52-61, Jan.-Feb. 2004.doi: 10.1109/MM.2004.1268997 (Year: 2004).*

(Continued)

*Primary Examiner* — Jeffery L Williams
(74) *Attorney, Agent, or Firm* — Jaffery Watson Mendonsa & Hamilton LLP

(57) ABSTRACT

Systems and methods for high performance IDS/IPS with efficient metadata filtering are provided. According to one embodiment, a signature database of an IDS/IPS is configured with multiple metadata signatures. A pre-match engine identifies a candidate packet of network traffic received by the IDS/IPS for full-feature match processing by: (i) categorizing the metadata signatures based on characteristics thereof; and (ii) processing and filtering a first set of the metadata signatures that forms part of a hash key based metadata signature category. The hash key based metadata signature category represents a category resulting from the categorization and each of the first set of metadata signatures is associated with a fixed unique hash key based on which respective metadata signatures are matched with the received network traffic to identify the candidate packet. Finally, a potential intrusion is identified by performing the full-feature match processing on the candidate packet based on full-feature match signatures.

19 Claims, 9 Drawing Sheets

(56) References Cited

OTHER PUBLICATIONS

Kostas G. Anagnostakis, Spiros Antonatos, Evangelos P. Markatos, Michalis Polychronakis, "E2xB: A domain-specific string matching algorithm for intrusion detection", Proc. of IFIP International Information Security Conference, 2003, p. 1-12. (Year: 2003).*
Haoyu Song, T. Sproull, M. Attig and J. Lockwood, "Snort offloader: a reconfigurable hardware NIDS filter," International Conference on Field Programmable Logic and Applications, 2005., Tampere, 2005, pp. 493-498. doi: 10.1109/FPL.2005.1515770 (Year: 2005).*

* cited by examiner

FILTERING OF METADATA SIGNATURES

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2016, Fortinet, Inc.

BACKGROUND

Field

Embodiments of the present invention generally relate to Intrusion Prevention Systems (IPS). In particular, embodiments of the present invention relate to filtering of metadata signatures for pattern matching in high performance IPS.

Description of the Related Art

Electronic communication over a network or over a series of networks is a critical enabling technology for a diverse range of commercial and social interactions. Recent rapid expansion of the Internet has triggered widespread use of applications that offer services such as sending and receiving electronic messages, querying of large online information databases and software, music and video distribution. As more systems are connected to these networks and more services are utilized, the amount of traffic being carried on the networks increases. Furthermore, once connected to a network, a system is vulnerable to malicious attacks from other connected systems.

Network intrusion detection systems (IDS) aim to analyze packets in a network, detect malicious packets and inform other systems or users of the detections. Network intrusion prevention systems (IPS), on the other hand, aim to analyze packets in a network, detect malicious packets, inform other systems or users of the detections and, in addition, remove all malicious packets from the network. Potentially malicious attacks are detected within IDS and IPS systems by matching network traffic to IDS/IPS rules/signatures. To ensure that systems are protected against all previously encountered malicious attacks, signatures that detect newly discovered attacks are always appended to the previous set of signatures, wherein each signature includes one or more patterns against which the incoming packets are matched.

Modern IPS includes a signature database that stores thousands of signatures that are used for intrusion detection/prevention. Such a signature database can include rules describing packet characteristics, derived properties, signature patterns, relationships between the characteristics and signature patterns, and relationships between rules. Exemplary packet characteristics can include packet headers, protocol identifiers and traffic flow identifiers or properties. Derived properties may include calculated cyclic redundancy check (CRC) values, destination routes, and the like. Existing signature databases are growing extremely fast as more and more security holes and attacks are being discovered on daily basis, and new IPS signatures are being added to these database. In implementation, IPS refers to one or more signature databases in order to detect and prevent network intrusions dynamically as they occur or to conduct post-mortem analysis after an intrusion has occurred. A typical dynamic network IPS can include a monitoring component that is able to capture network packets as the packets pass through the IPS, an inference component for determining whether the captured traffic is representative of malicious activity by finding a match in the signature database, and a response component configured to react appropriately to the detection of an intrusion. Typical responses may include generation and transmission of a simple e-mail message to a system administrator, or an auto corrective action, for instance temporarily blocking traffic flowing from an offender's Internet protocol (IP) address.

Conventional IPS technology can incorporate a variety of methodologies for determining whether malicious activity has occurred or is occurring. Prior art solutions include different detection methodologies for intrusion detection, for instance, simple pattern matching, stateful pattern matching, protocol decode based matching, heuristic-based matching, among others. Pattern matching is considered to be the most primitive of the detection methodologies employed in a typical IPS, and is based on inspecting traffic to identify a fixed sequence of bytes in a single packet. The fixed sequence of bytes, referred to in the art as a "signature", when identified within inspected traffic, can trigger an alarm. Typical patterns used by an IPS can broadly be classified as fixed-string patterns such as "ABC" at any location, regular expression based patterns (also referred to as Perl Compatible Regular Expressions (PCREs)) such as "[0-9][A-Z]{3}", and metadata patterns such as "Destination Port=443".

In metadata based pattern matching, IPS detects intrusion based on metadata information/attributes available in a data packet, wherein the metadata attributes can include meaningful information or parameters extracted or derived from a data packet header. Such metadata may consist of, for instance, one or a combination of source or destination ports, packet size, sequence number, source or destination IP address, special service types or protocols, Transmission Control Protocol (TCP) flags or other fields from TCP, User Datagram Protocol (UDP) or Internet Control Message Protocol (ICMP) packet headers. Most existing IPS are focused on filtering and pre-matching of fixed-string patterns and limited types of regular expression patterns. While there are many known filtering algorithms for fixed-string patterns, very few exist for metadata signatures and those employing traditional protocol/service/flow based sensor trees are inefficient.

Therefore, there exists a need for systems and methods for filtering of metadata signatures for pattern matching in high performance IPS.

SUMMARY

Systems and methods are described for high performance IDS/IPS with efficient metadata filtering. According to one embodiment, a signature database of an intrusion detection system (IDS) or an intrusion prevention system (IPS) is configured with multiple metadata signatures. A pre-match engine of the IDS or the IPS identifies a candidate packet of network traffic received by the IDS or IPS for full-feature match processing by: (i) categorizing the metadata signatures into one or more metadata signature categories based on characteristics of the metadata signatures; and (ii) processing and filtering a first set of metadata signatures of the metadata signatures that forms part of a hash key based metadata signature category. The hash key based metadata signature category forms part of the one or more metadata signature categories and each of the first set of metadata signatures is associated with a fixed unique hash key based on which respective metadata signatures are matched with the received network traffic to identify the candidate packet. Finally, a potential intrusion is identified by a full-feature match engine of the IDS or the IPS performing the full-feature match processing on the candidate packet based on one or more full-feature match metadata signatures.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
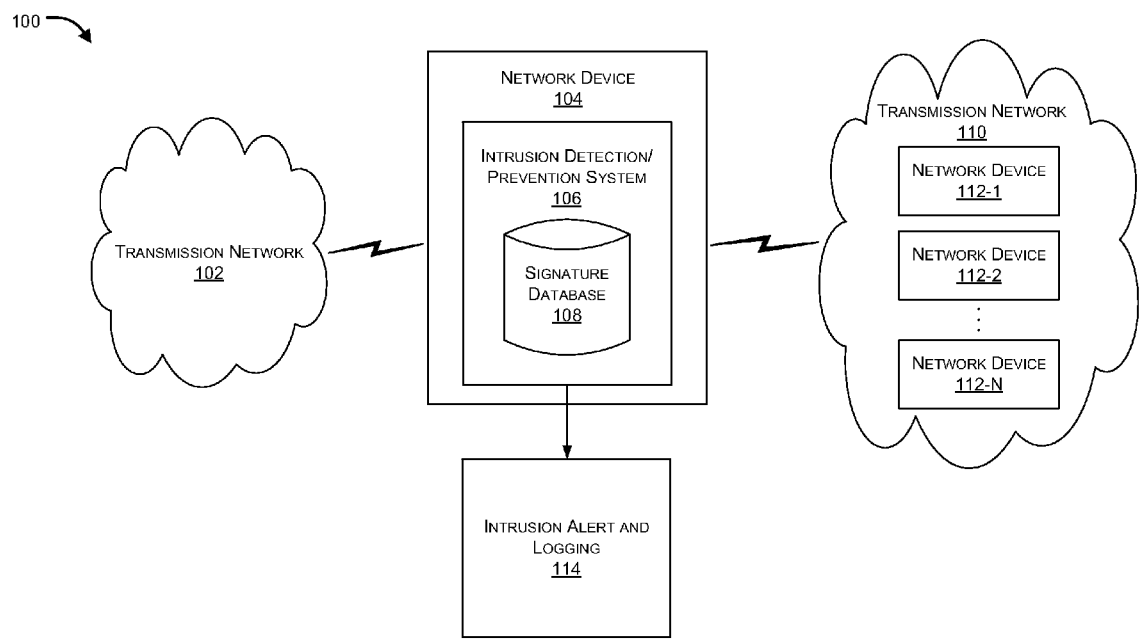
FIG. 1 illustrates an exemplary network architecture incorporating an intrusion detection and prevention system in accordance with an embodiment of the present invention.

Systems and methods are described for high performance IPS with efficient metadata filtering. In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) toper form a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named The present disclosure relates to systems and methods for filtering of metadata signatures for pattern matching in high performance IPS.

In an aspect, the present disclosure relates to an intrusion detection system that can include a signature database storing multiple metadata signatures; a full feature match engine configured to perform full-feature match processing of a candidate packet of received network traffic based on one or more full-feature match metadata signatures; and a pre-match engine that identifies the candidate packet of the received network traffic for full feature match processing by the full feature match engine.

In an aspect, the metadata signatures can be based on any or a combination of source port based conditions, destination port based conditions, packet size based conditions, packet sequential number based conditions, special service type based conditions, special service protocol based conditions, TCP flag based conditions, IP address based conditions, and packet header information based conditions.

In an aspect, the pre-match engine can include a metadata signature categorization module that can be configured to categorize the metadata signatures into one or more metadata signature categories based on characteristics of the metadata signatures; and a hash key based metadata signature filtration module that can be configured to process and filter a first set of metadata signatures of the metadata signatures that forms part of a hash key based metadata signature category, wherein the hash key based metadata signature category forms part of the one or more metadata signature categories, and wherein each of the first set of metadata signatures is associated with a fixed unique hash key based on which respective metadata signatures are matched the received network traffic to identify the candidate packet.

In another aspect, the hash key based metadata signature category can include protocol information based metadata signatures, service based metadata signatures, fixed port based metadata signatures, and other fixed type metadata signatures. In yet another aspect, the other fixed type metadata signatures can further be divided into one or a combination of fixed remote procedure call (RPC) number based metadata signatures, fixed TCP flag based metadata signatures, fixed IP option based metadata signatures, fixed ICMP type based metadata signatures, fixed SERVICE type based metadata signatures, fixed FILE type based metadata signatures, fixed HTTP type based metadata signatures, fixed MISC type based metadata signatures, and fixed key based metadata signatures.

In another aspect, the system can further include a range based metadata signature filtration module that can be configured to process and filter a second set of metadata signatures that forms part of a range based metadata signature category, wherein the range based metadata signature category forms part of the one or more metadata signature categories, and wherein each of the second set of metadata signatures is associated with at least one range that is mapped to a corresponding/defined mapping value based on which the respective metadata signatures are matched with the received network traffic to identify the candidate packet. In an aspect, the range based metadata signature category can include mixed range based metadata signatures, and http range based metadata signatures.

In another aspect, the system can further include a bit-mask based metadata signature filtration module that can be configured to process a third set of metadata signatures that form part of a bit-mask based metadata signature category, wherein the bit-mask based metadata signature category forms part of the one or more metadata signature categories, and wherein each of the third set of metadata signatures is split into a defined number of parts to enable each part to be processed separately and bit-masked with corresponding parts of packets of the received network traffic to identify the candidate packet. In an aspect, the bit-mask based metadata signature category can include IP address based metadata signatures. Furthermore, after part based filtration and matching, bits associated with outcome of each part can undergo a logical AND operation to determine a final match outcome for the complete metadata signature. Still further, in an aspect, each part of the number of parts that each metadata signature is split into can be associated with corresponding mapping values to enable parallel processing for multiple metadata signatures of the third set of metadata signatures.

In another aspect, the system can further be configured to support filtration and matching of multiple conditions that form part of one or more metadata signatures and are expressed in the alternative.

In an aspect, the present disclosure further relates to a method for intrusion detection comprising the steps of configuring a signature database comprising multiple metadata signatures; performing full-feature match processing of a candidate packet of received network traffic based on one or more full-feature match metadata signatures; and configuring a pre-match engine that identifies the candidate packet of the received network traffic for the full-feature match processing. In an aspect, the pre-match engine can be configured to perform the steps of categorizing the metadata signatures into one or more metadata signature categories based on characteristics of the metadata signatures; and processing and filtering a first set of metadata signatures of the metadata signatures that forms part of a hash key based metadata signature category, wherein the hash key based metadata signature category forms part of the one or more metadata signature categories, and wherein each of the first set of metadata signatures are associated with a fixed unique hash key based on which respective metadata signatures are matched the received network traffic to identify the candidate packet.

FIG. 1 illustrates an exemplary network architecture 100 incorporating an intrusion detection and prevention system in accordance with an embodiment of the present invention. As shown in FIG. 1, an intrusion detection/prevention system 106, which may be referred to interchangeably as IDS or IPS hereinafter, can be configured within a network device 104 that is logically interposed between two transmission networks, for example transmission network 102 and transmission network 110. In an exemplary implementation, IDS 106 can be configured to protect a transmission network, for example, a local area network (LAN), a wide area network (WAN), an individual computing device, or a data centre from intrusions or malicious content. For example, IDS 106 can be configured to protect network devices/resources, such as network device 112-1, network device 112-2, . . . , and network device 112-N, which may be collectively and interchangeably referred to as network device 112 hereinafter. A typical IDS 106 includes a signature database 108 that can be configured to store multiple signatures based on which intrusions can be detected. In implementation, IDS 106 typically receives data packets from network traffic, and analyses the received data packets based on pre-stored signatures (each signature including one or more patterns) to detect a potential intrusion. For instance, if a packet in the received traffic matches with a pattern defined in a signature, the packet can be detected/classified/categorized as being malicious.

In an aspect, signature database 108 can be configured to store thousands of signatures that are used for intrusion detection/prevention. Signatures stored in the signature database 108 can include fixed string signatures, regular expression based signatures, and metadata based signatures. Metadata based signatures include rules describing packet characteristics, derived properties, signature patterns, relationships between the characteristics and signature patterns, and relationships between rules. As those skilled in the art will appreciate, exemplary packet characteristics include, but are not limited to, values of packet header fields, protocol identifiers and traffic flow identifiers, or properties. Derived properties may include calculated cyclic redundancy check (CRC) values, destination routes, and the like.

In an exemplary implementation, IDS 106 can be configured to process data packets received from incoming traffic using a pre-match engine that can be configured to pre-match one or more specific properties of the received data packets with the pre-stored metadata signatures, and further include a full-feature match engine configured to perform full feature match of the properties of the received data packets with pre-stored metadata signature. Embodiments of the present disclosure provide systems and methods for efficient processing for filtering metadata signatures, and matching of metadata signatures by the pre-match engine with packets of the received data traffic.

In an aspect, IDS 106 can be configured to categorize the metadata signatures into protocol based metadata signatures, service based metadata signatures, fixed-port based metadata signatures, destination IP based metadata signatures, mixed range based metadata signatures, other HTTP range based metadata signatures, and other fixed-type based metadata signatures.

In an aspect, protocol based metadata signatures, service based metadata signatures, fixed port based metadata signatures, and other fixed type signatures (which may collectively also be referred to as a first set of signatures) can be uniquely represented through and matched with respect to their respective hash values to enable hash-based key filtering. As these categories of signatures include integer/fixed values, a hash key value for each metadata signature of the first set of metadata signatures can be determined, and used by the pre-match engine for performing filtering of metadata signatures and matching data packets received from network traffic. In an aspect, such metadata signatures that can be filtered/categorized based on their respective hash values can also be collectively/interchangeably referred to as hash-key based metadata signatures.

In another aspect, mixed range based metadata signatures and other HTTP range based metadata signatures (which may be collectively referred to as a second set of signatures) are typically associated with ranges/range values, wherein these ranges can be mapped with defined classes for signature filtering. For instance, Sig #1 can be defined to mark packets of sizes between 40 bytes and 64 bytes as malicious, whereas Sig #2 can be defined to mark packets having Seq No.<4 as malicious. Classes can therefore be formed for these ranges, wherein, for instance, packets sizes of 0-40 bytes can be class 1, packets sizes of 41-80 bytes can be class 2, and packets sizes of 81 bytes and higher can be class 2, and each signature can therefore be classified into one or more classes and matched with the incoming packets accordingly. In an aspect, such metadata signatures that can be filtered/categorized based on their respective integer value ranges can therefore also be collectively/interchangeably referred to as integer range based metadata signatures.

In another exemplary implementation, destination IP based metadata signatures (which may be collectively referred to as a third set of signatures) can be segmented into one or more parts to enable bit-mask operation based filtering of metadata signatures. For instance, a destination IP address (e.g., 259.168.245.223) can be separated into four bytes (e.g., 259, 168, 245, and 223), wherein each byte can be filtered separately, and the output of each filter (e.g., a bit indicative of whether the byte at issue satisfies the filtering condition) can be combined together as a final filter for the destination IP address with a logical AND operation. Using this approach, such metadata signatures take only one extra bit of memory and allow efficient filtering in terms of both CPU cycles and memory usages. This approach is thought to be especially useful for whitelisting or blacklisting of Uniform Resource Locators (URLs) in connection with performing URL filtering. Though in the present disclosure, destination IP based metadata signatures are described/exemplified, those skilled in the art will appreciate the more general applicability to other IP packet attributes (e.g., Media Access Control (MAC) addresses or source IP addresses in connection with metadata signatures for use in connection with bit-mask based filtering). This third set of metadata signatures can also be interchangeably referred to as bit-mask based metadata signatures.

Figure 2:
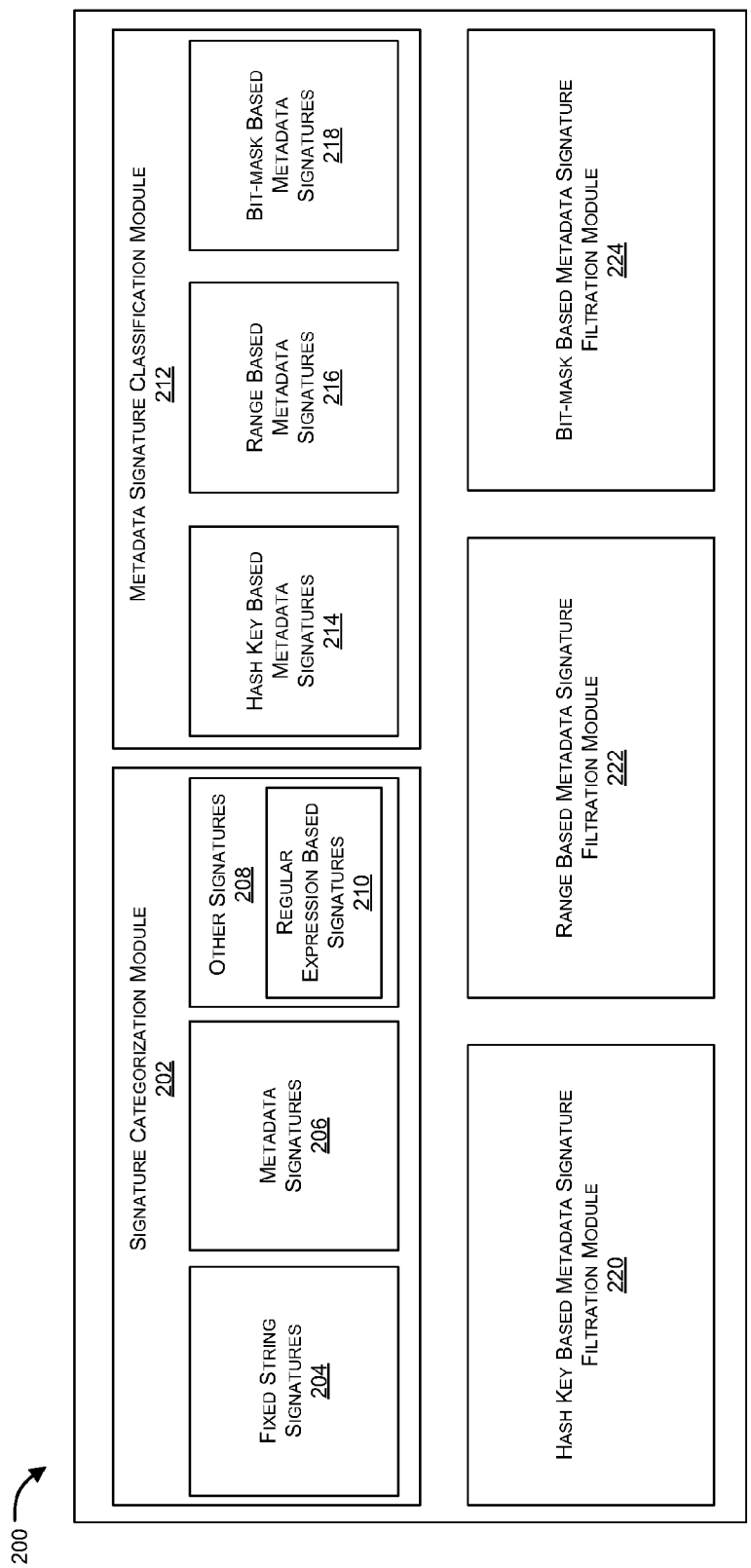
FIG. 2 illustrates an exemplary module diagram of a metadata signature filtering and pre-match optimization system of an IPS in accordance with an embodiment of the present invention.

FIG. 2 illustrates an exemplary module diagram of a metadata signature filtering and pre-match optimization system of an IDS or an IPS 200 in accordance with an embodiment of the present invention. As shown in FIG. 2, IDS 200 includes a signature categorization module 202 that is configured to categorize multiple metadata signatures into fixed string signatures 204, metadata signatures 206, and other signatures 208, such as regular expression based signatures 210. In an implementation, metadata signatures 206 can include signatures that are not optimal for filtering based on fixed string patterns, but rather are used for filtering based on metadata attributes of incoming packets. Such metadata attributes can include, but are not limited to, source or destination ports, packet size or sequence number, service type or protocol, TCP flags, IP addresses, or other fields from TCP, UDP, or ICMP packet headers.

In an aspect, metadata signatures 206 can be categorized into protocol based signatures (for example, "protocol=99"), service type based signatures (for example, "service=MSSQL"), fixed port based signatures (for example, "destination port=443"), destination IP address or source IP based signatures (for example, "destination IP address=224.0.0.4"), mixed range based signatures (for example, "packet size between 40 bytes and 64 bytes and sequential number<=4"), other HTTP range based signatures (for example "HTTP host size>=100 AND body size<=10"), and other fixed type signatures (for example, "ICMP type=8 and ICMP code=0"). In an exemplary implementation, metadata signatures 206 can be based on any or a combination of source port based conditions, destination port based conditions, packet size based conditions, packet sequence number based conditions, special service type based conditions, special service protocol based conditions, TCP flag based conditions, IP option based conditions, IP address based conditions, and other packet header field based conditions.

In an aspect, IDS 200 can include a metadata signature classification module 212 that can be configured to analyze multiple metadata signatures 206 based on their characteristics, and classify the metadata signatures 206 into one or more classes to create a first set of metadata signatures 214 (which may also be referred to as hash-key based metadata signatures 214), a second set of metadata signatures (which may also be referred to as range based metadata signatures 216), and a third set of metadata signatures (which may also be referred as bit-mask based metadata signature 218).

In an aspect, metadata signature categorization module 212 can classify fixed protocol based signatures, service type based signatures, fixed port based signatures, and other fixed type signatures as part of the hash-key based metadata signatures, as hash values for each signature of this category can be computed, which can later be used for filtering and matching with hash values of corresponding metadata of packets of received traffic data. For instance, exemplary hash-key based metadata signatures can include "Destination Port=443" or "ICMP Type=8 AND ICMP Code=0".

In another aspect, metadata signature categorization module 212 can classify mixed range based signatures, other HTTP range based signatures, and other header metadata range based signatures as part of range based metadata signatures 214. In an implementation, a mapping table that includes an integer range and a corresponding mapping value for each type of metadata can be used to determine a mapping value for each signature of the range based metadata signatures 216. Exemplary metadata signatures under this category can include "Destination Port: 442 to 448, or "Packet Size between 512 bytes and 1024 bytes AND Sequential Number<=4".

In another aspect, metadata signature categorization module 212 can classify source IP addresses, destination IP addresses, MAC address, or any address based metadata signatures that be split into multiple parts as part of bit-mask based metadata signatures 218. For instance, exemplary bit-mask based metadata signatures 218 include "destination IP address=192.165.1.220", which can be split into four parts "192", "165", "1", and "220", and can, in parallel, be matched with destination IP address information of incoming packets.

In an aspect, it should understood that although, in the present illustration, metadata signatures 206 have been categorized in the three categories such as hash key based metadata signatures 214, range based metadata signatures 216, and bit mask based metadata signatures 218, it possible to categorize the metadata signatures 206 in other or additional categories based on their respective characteristics. For example, module 212 can create more categories by splitting other-fixed-type-signatures into sub-groups based on their unique TCP flags, IP options, ICMP types, or other sub-keys.

In an aspect, sub-categories can include fixed RPC number based signatures, fixed TCP flag based signatures, fixed IP option based signatures, fixed service based signatures, fixed file type based signatures, fixed HTTP type based signatures, and fixed MISC type (such as same IP, small size packet etc.) based signatures.

In an exemplary implementation, system 200 can include a pre-match engine that can be configured to filter the metadata signatures and identify candidate packet(s) from received network traffic that will then undergo full feature match. System 200 can include multiple filtration modules including a hash key based metadata signature filtration module 220, a range based metadata signature filtration module 222, and a bit-mask based metadata signature filtration module 224, configured to filter the metadata signatures 206 based on their respective classifications, and process/match packets of the network traffic using metadata signatures of the respective class to determine/identify candidate packets that require further processing by a full feature match engine (not shown) of system 200.

In an exemplary embodiment, hash key based metadata signature filtration module 220 can be configured to process and filter a first set of metadata signatures (hash key based metadata signatures 214), wherein each of the first set of metadata signatures 214 is associated with a fixed unique hash key based on which the respective metadata signatures can be filtered and matched with hash values computed for metadata of packets of the received network traffic. In implementation, module 220 can simply utilize a HASH comparison and search algorithm for filtering the metadata-signatures. In an exemplary implementation, the hash-key-values or buckets can be an N (multiple integers or strings) to one (integer) map. For example a destination-port (ranging from 0 to 65535) could be mapped using modulo division (e.g., x % 256, where the % operator represents mod). In an instance, the first signature (in the first set of metadata signatures) can be "destination port=187", the second signature (in the first set of metadata signatures) can be "destination port=443", and the third signature (in the first set of metadata signatures) can be "destination port=1024", wherein in case the destination port value of a received packet is 443, as 443% 256=187, both the first and the second signatures match with the received packet at the pre-match stage and therefore the packet can be accordingly sent to the full feature match engine for full-feature matching.

In an exemplary embodiment, range based metadata signature filtration module 222 can be configured to process and filter a second set of metadata signatures (range based metadata signatures), wherein each of the second set of metadata signatures is associated with at least one range that is mapped to a corresponding/defined mapping value, based on which the respective metadata signatures can be filtered and matched with corresponding mapped values of incoming packets, to identify candidate packets for full feature matching. In an aspect, range based metadata-signatures may have special values within certain ranges, for example, mixed range based signatures and other HTTP range based signatures. In an aspect, instead of using a hash value directly, module 222 can first create corresponding mapping values for the ranges using a mapping table, for example, mapping Table-1 given below, post which the module 22 can then perform processing on the mapped values.

Table 1 illustrates an exemplary mapping table for port range based signatures:

| Mapping Range for Destination Port Value | Mapped Value |
|---|---|
| 0-80 | 0 |
| 81-443 | 1 |
| 444-1000 | 2 |
| 1001-1024 | 3 |
| 1025-4500 | 4 |
| 4501-15000 | 5 |
| 15001-65536 | 6 |

Based on Table 1, the condition "destination port between 3200 and 3299" could be mapped to value 4, and thus it can be filtered with a simpler condition "mapped value=4".

In an aspect, modules 220 and 222 can be executed by the pre-match engine to simultaneously filter hash-key based metadata signatures as well as the mapping value based metadata signatures.

In an exemplary embodiment, bit-mask based metadata signature filtration module 224 can be configured to process and filter a third set of metadata signatures (bit-mask based signatures), wherein each of the third set of metadata signatures is split into a defined number of parts to enable each part to be filtered separately and bit-masked with corresponding parts of packets of the received network traffic to identify the candidate packet. In an exemplary implementation, the bit-mask based metadata signature category can include IP address based metadata signatures. In an exemplary implementation, after part based filtration and matching, bits associated with outcome of each part can undergo an AND operation to determine final match outcome for the complete metadata signature. Some metadata-signatures may have a defined logic combination of meta-conditions, which combinations can be presented in the form of bit-mask operations. For example, module 224 can break a destination IP address into four bytes, wherein each byte can be filtered separately, and then the system can combine them together through logical AND operation to produce a final filter result. By doing bit-mask based filtering and matching, each of those meta-signatures takes only one extra bit of memory space, and therefore system 200 can filter those signatures efficiently in terms of both CPU cycles and memory usage. A non-limiting example application of bit-mask-based filters is implementation of URL whitelists and/or blacklists for use in connection with URL filtering.

In an exemplary implementation, modules 220, 222, and 224 can be configured to process/filter respective hash-key based metadata signatures 214, range based metadata signatures 216, and bit-mask based metadata signatures 218 in parallel. In an exemplary implementation, other dedicated modules, which work in parallel, can also be created for filtering other types of metadata signature.

Figure 3:
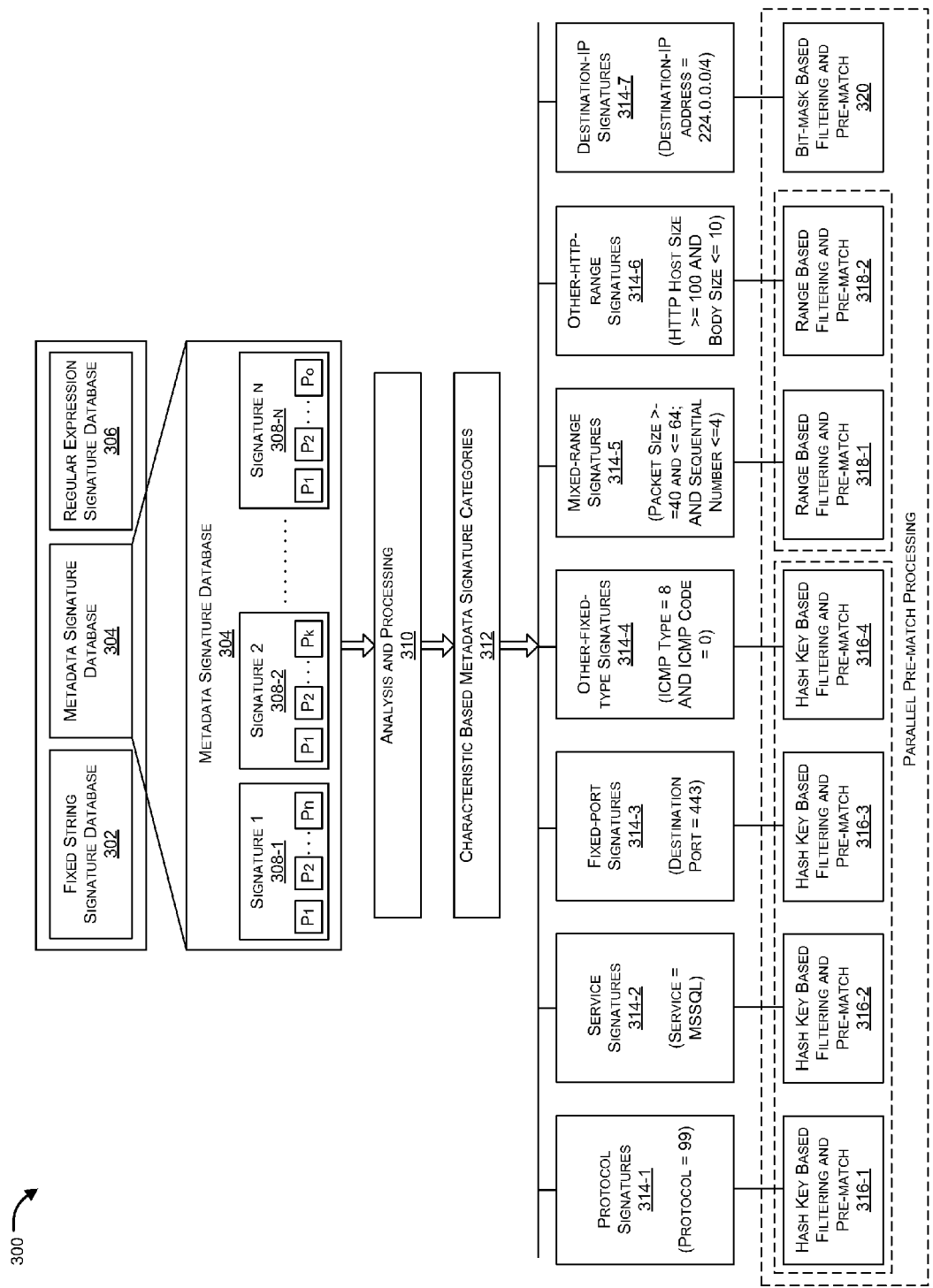
FIG. 3 illustrates an exemplary block diagram of metadata signature filtering and pre-match optimization system of an IPS that utilizes characteristic based metadata categorization in accordance with an embodiment of the present invention.

FIG. 3 provides a concrete example of operation of a metadata signature filtering and pre-match optimization system 300 of an IPS that utilizes characteristic based metadata categorization in accordance with an embodiment of the present invention. As shown in FIG. 3, a signature database of IDS may include fixed string signature database 302, metadata signature database 304, and regular expression signature database 306. In an exemplary implementation, metadata signature database 304 can include multiple metadata signatures such as signature-1 308-1, signature-2 308-2, and signature-N 308-N, which may be collectively and interchangeably referred to as metadata signatures 308 hereinafter. Each signature 308 can include one or more patterns that need to be matched with the incoming packets to identify matching packets for further analysis or classification as malware.

In an aspect, analysis and processing 310 can be performed on the metadata signatures 304 so as to create characteristic based metadata signature categories 312, which can include, in an exemplary implementation, protocol signatures 314-1, service signatures 314-2, fixed port signatures 314-3, other fixed type signatures 314-4, mixed range signatures 314-5, other HTTP range signatures 314-6, and destination IP address signatures 314-7, which may be collectively referred to as signature categories. In an aspect, signature categories 314 can be group based on one or more characteristics of the metadata signatures. For instance, protocol signature 314-1, service signature 314-2, fixed port signature 314-3, and other fixed type signatures 314-4 can be processed in parallel using hash-key based filtering and pre-match engine 316-1, hash key based filtering and pre-match engine 316-2, hash key based filtering and pre-match engine 316-3, and hash key based filtering and pre-match engine 316 respectively. Similarly, mixed range signatures 314-5, and other HTTP range signatures 314-6 can be processed in parallel by range based filtering and pre match engine 318-1 and range based filtering and pre-match engine 318-2 respectively. Similarly, destination IP signatures 314-7 can be processed in parallel by bit-mask based filtering and pre-match engine 320. In an exemplary implementation, all the filtering and pre-match engines can work in parallel to process respective metadata signatures of different categories.

Figure 4:
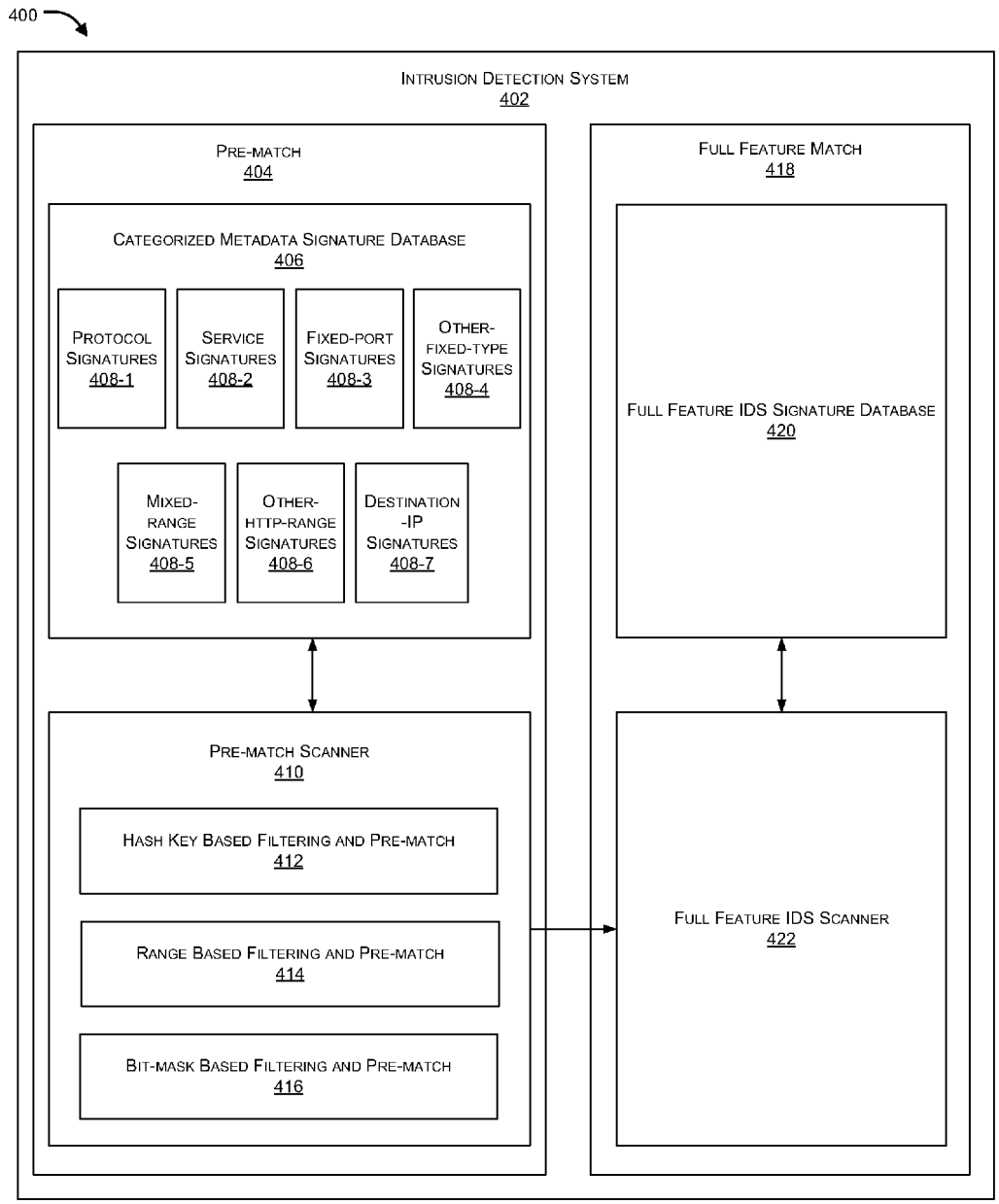
FIG. 4 illustrates an exemplary IPS system having a pre-match scanner and full feature match scanner for providing high performance intrusion detection in accordance with an embodiment of the present invention.

FIG. 4 illustrates an IDS system 402 having a pre-match stage 404 and full feature match stage 418 for providing high performance intrusion detection in accordance with an embodiment of the present invention. In the context of the present example, pre-match stage 404 includes a categorized metadata signature database 406 that further includes protocol signatures 408-1, service signatures 408-2, fixed port signatures 408-3, other fixed type signatures 408-4, mixed range signatures 408-5, other HTTP range signatures 408-6, and destination IP signatures 408-7. Pre-match stage 404 may include multiple pre-match scanners or engines (e.g., hash key filtering and pre-match engine 412, range based filtering and pre-match engine 414, and bit-mask filtering and pre-match engine 416). The multiple pre-match engines of pre-match scanner 410 can be configured to process one or more signature categories in parallel so as to filter the metadata signatures, and identify candidate packet(s) from the received network traffic that need to be processed by the full feature match stage 418. Full feature match stage 418 may have a separate full-feature IDS signature database 420, which can be used by a full feature IDS scanner 422 for processing the identified candidate packet(s).

Figure 5A:
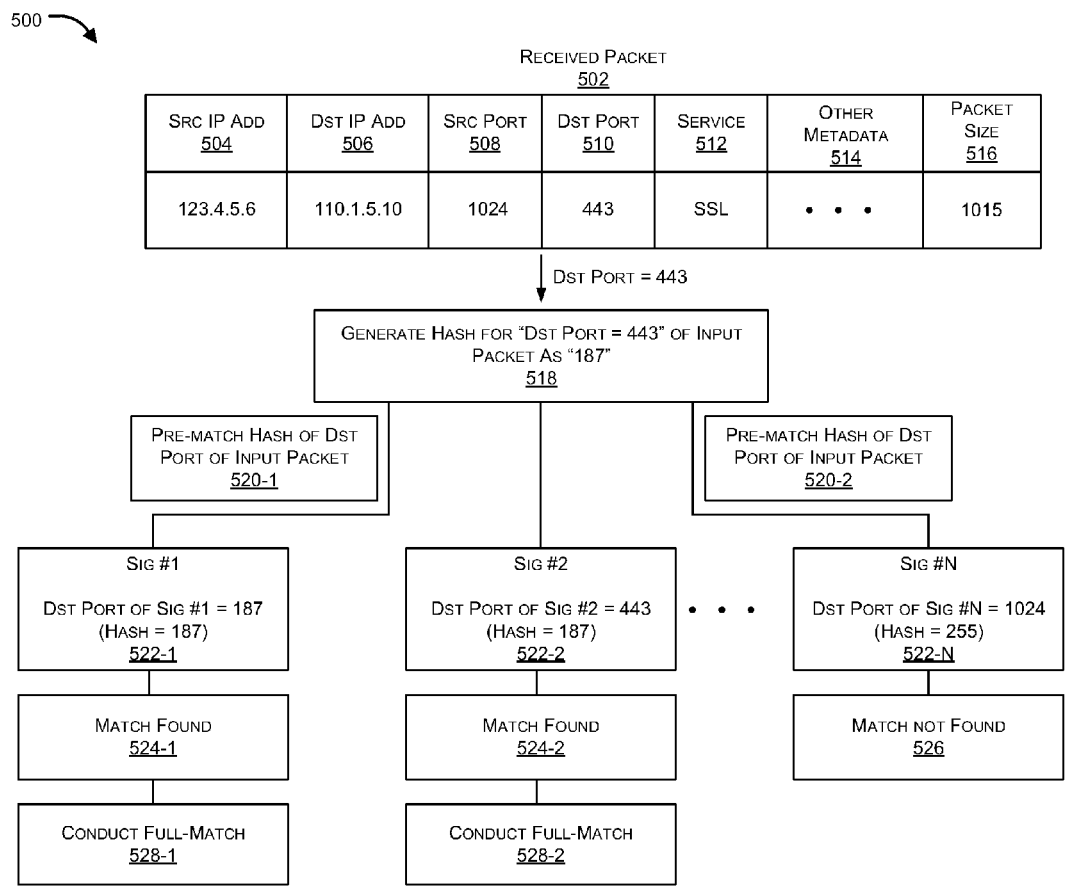
FIG. 5A illustrates exemplary data packet processing by hash key based metadata signatures in accordance with an embodiment of the present invention.

FIG. 5A illustrates exemplary data processing using hash key signature filtering and pre-match engine in accordance with an embodiment of the present invention. As shown in FIG. 5A, a received packet 502 may include header information, including, but not limited to, a Source (Src) IP address 504, a Destination IP address 506, a Src port 508, a Destination port 510, a service 512, among other metadata 514, and a packet size 516. For processing and matching with respect to destination port based signatures, Dst port (shown having a value of 443) of the received packet 502 can be extracted, and a hash key can be generated for the value at step 518, for example, the hash key for Dst port of the received packet would be 187 (computed using a mapping of x % 256, where x is given port address). The hash value of the Dst port of the received input packet can then be matched, in parallel, by the hash key based filtering and pre-match engine with respect to the hash-key based signatures having the same metadata attribute, such as Sig #1 522-1, Sig #2 522-2, and Sig #N 522-N, each of which has its hash key value computed. For example Sig #1 522-1 has a condition indicating Dst port=187, Sig #2 522-2 has a condition indicating Dst port=443, and Sig #N 522-N has a condition indicating Dst port=1024, which respectively have hash values of 187, 187, and 255. As shown, a match between the hash value of the received packet is found with respect to Sigs #1 and #2 as each have a hash value of 187, and therefore the received packet can be identified as a candidate packet to be processed by the full match engine.

Figure 5B:
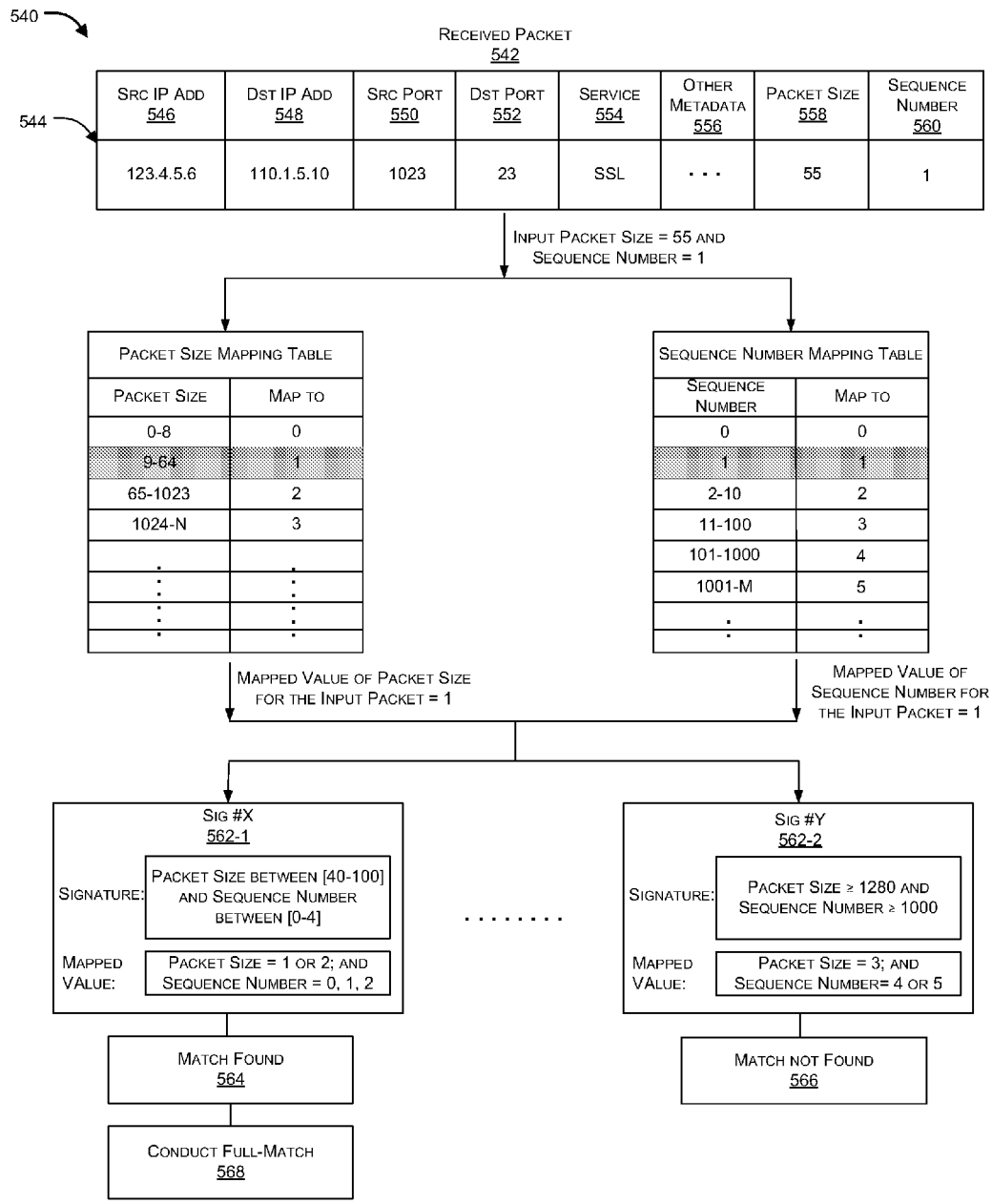
FIG. 5B illustrates exemplary data packet processing by mapping value based metadata signatures in accordance with an embodiment of the present disclosure.

FIG. 5B illustrates exemplary data packet processing using a mapping value based filtering and pre-match engine in accordance with an embodiment of the present disclosure. As shown in FIG. 5B, a received packet 542 may have several metadata attributes 544 within a header. In the present example, metadata attributes 544 include a Src IP address 546, a Dst IP address 548, a Src port 550, a Dst port 552, a Service 554, other metadata 556, a packet size 558 and a sequence number 560. In an instance, for matching with range based metadata signatures, metadata input, for example, input packet size=55 and sequence number=1 can individually be mapped to corresponding mapping values using respective mapping tables, for example a packet size mapping table and a sequence number mapping table. As shown in FIG. 5B, a mapped value of packet size 55 for received packet 542 is 1, and a mapped value of sequence number 1 for received packet is 1. Further, the mapping value based filtering and pre-match engine can process the mapping value based metadata signatures in parallel to identify an appropriate match, if any. In the present example, Sig. #X 562-1 is defined as "packet size between [40-100] and sequence number between [0-4]", for which the mapped value for packet size is 1 or 2, and the mapped value of the sequence number can be 0, 1 or 2. Similarly, Sig #Y 562-2 is defined as "packet size=1280 and sequence number greater than or equal to 1000", which maps to a mapped value of 3 for the packet size, and maps to mapped values of 4 or 5 for the sequence number. As shown, a match for the received packet is found in Sig #X at step 564 and a match is not found for Sig #Y as shown at 566, making input packet 542 a candidate for full-feature match based on Sig #X.

Figure 5C:
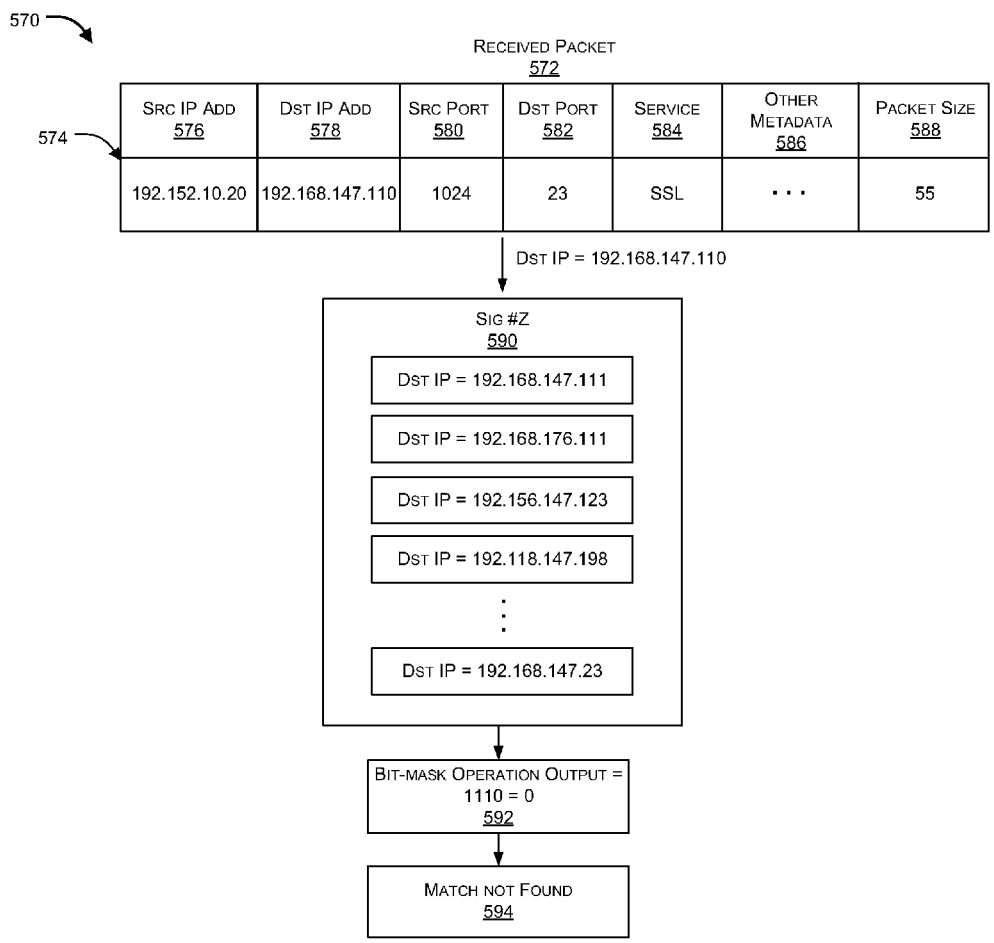
FIG. 5C illustrates exemplary data packet processing by bit-mask based metadata signatures accordance with an embodiment of the present disclosure.

FIG. 5C illustrates exemplary data packet processing by a bit-mask based filtering and pre-match engine in accordance with an embodiment of the present disclosure. As shown in FIG. 5C, input packet 572 can include several metadata fields 574, including, but not limited to, a Src IP address 576, a Dst IP address 578, a Src Port 580, a Dst Port 582, a Service 584, other metadata 586, and a packet size 588. Relevant metadata, for example, Dst IP address=192.168.147.110 can be extracted from input packet 572. Bit-mask based filtering and pre-matching with respect to one or more destination IP address based metadata signatures can then be performed. In an instance, Sig #Z can include multiple IP addresses, each of which, along with the destination IP address of input packet 572, can be split into four parts, and matched in parallel with respective parts of the destination IP addresses of the signature. For instance, Dst IP address=192.168.147.110 of input packet 572 can be split into 192, 168, 147, and 110, and each of these parts can then be matched in parallel with respective parts of the IP addresses of Sig #Z. When there is a match between corresponding parts of the IP address at issue and the IP address of a signature, a flag can be set to 1 (True), and when there is not a match the flag can be set to 0 (False). For instance, 192.168.147.110 when compared with 192.168.147.111 yields a bit mask of 1110 as output as the fourth part (i.e., 110) of Dst IP address 578 does not match with the fourth part 111 the IP address of Sig #Z, but all other corresponding parts match. Each portion of the resulting bit mask may then be logically ANDed together to produce a final output, which if True (1) identifies a matching signature and input packet 572 is identified as a candidate packet for a full scan.

Figure 6:
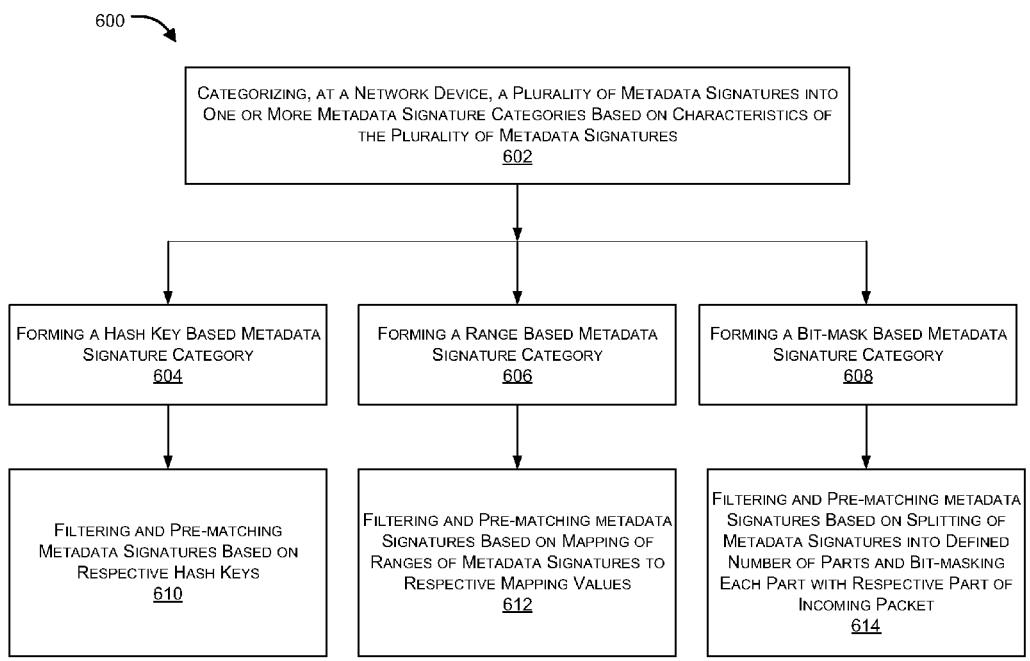
FIG. 6 is a flow diagram illustrating a metadata signature filtering and pre-matching process for efficient intrusion detection in accordance with an embodiment of the present invention.

FIG. 6 is a flow diagram illustrating a metadata signature filtering and pre-matching process for efficient intrusion detection in accordance with an embodiment of the present invention. As shown in FIG. 6, the method can include the steps of categorizing, at a network device, multiple metadata signatures into one or more metadata categories based on characteristics of the metadata signatures, as shown at step 602. The method can further include steps of forming a hash key based metadata signature category, as shown at step 604, forming a range based metadata signature category as shown at step 606, and forming a bit-mask based metadata signature category as shown at step 508. As shown in FIG. 6, the step of forming different categories can be performed in parallel and signatures under each category can be processed in parallel by respective engines assigned for that category. The method can further include the steps of filtering and pre-matching metadata signatures based on respective hash keys of the signatures of category 604 with hash keys of metadata of received packets, as shown at step 610, filtering and pre-matching metadata signatures based on mapping of ranges of metadata signatures to respective mapping values and the same calculated for the packets of received network traffic, as shown at step 612, and filtering and pre-matching metadata signature by splitting patterns of metadata signatures into defined numbers of parts and bit-masking each part with respective parts of the incoming packet (also referred to as packets from network traffic) to identify a candidate packet, as shown at step 614.

In an aspect, the method can include the steps of categorizing, at a network device, multiple metadata based signatures into one or more metadata signature categories such as a protocol based signature category, a service based signature category, a fixed port based signature category, other fixed type based signature category, a mixed range signature category, other HTTP metadata range based signature category, and a destination IP or a source IP based signature category, based on characteristics of the metadata based signatures, and processing each category of the one or more metadata signature categories in parallel by appropriate metadata signature filtering and pre-match engines, such as hash key based filtering and pre-match engine, mapping value/range based filtering and pre-match engine, and bit-mask based filtering and pre-match engine.

In an exemplary implementation, metadata signatures of the protocol based signature category, the service based signature category, the fixed port based signature category, and other fixed type based signature categories can be processed by the hash-key based filtering and pre-match engine for filtering the metadata signatures and identifying candidate packet(s) to be processed by the full match engine. In an exemplary implementation, the metadata signatures of the mixed range based signature category and other HTTP metadata range based signatures can be processed by range based filtering and pre-match engine for filtering the metadata signatures and identifying candidate packet(s) to be processed by the full match engine. In another exemplary implementation, the metadata signatures of the destination IP address based signature category can be processed by bit-mask based filtering and pre-match engine.

In an aspect, the present disclosure further relates to a method for intrusion detection comprising the steps of configuring a signature database having multiple metadata signatures; performing full-feature match processing of a candidate packet of received network traffic based on one or more full-feature match metadata signatures; and configuring a pre-match engine that identifies the candidate packet of the received network traffic for the full-feature match processing. In an aspect, the pre-match engine can be configured to perform the steps of categorizing the metadata signatures into one or more metadata signature categories based on characteristics of the metadata signatures; and processing and filtering a first set of metadata signatures of the metadata signatures that forms part of a hash key based metadata signature category, wherein the hash key based metadata signature category forms part of the one or more metadata signature categories, and wherein each of the first set of metadata signatures is associated with a fixed unique hash key based on which respective metadata signatures are matched with the received network traffic to identify the candidate packet.

In an aspect, the method further comprises the step of processing and filtering a second set of metadata signatures that forms part of a range based metadata signature category, wherein the range based metadata signature category forms part of the one or more metadata signature categories, and wherein each of the second set of metadata signatures is associated with at least one range that is mapped to a corresponding/defined mapping value based on which the respective metadata signatures are matched with the received network traffic to identify the candidate packet.

In another aspect, the method can further include the step of processing and filtering a third set of metadata signatures that form part of a bit-mask based metadata signature category, wherein the bit-mask based metadata signature category forms part of the one or more metadata signature categories, and wherein each of the third set of metadata signatures is split into a defined number of parts to enable each part to be processed separately and bit-masked with corresponding parts of packets of the received network traffic to identify the candidate packet.

Figure 7:
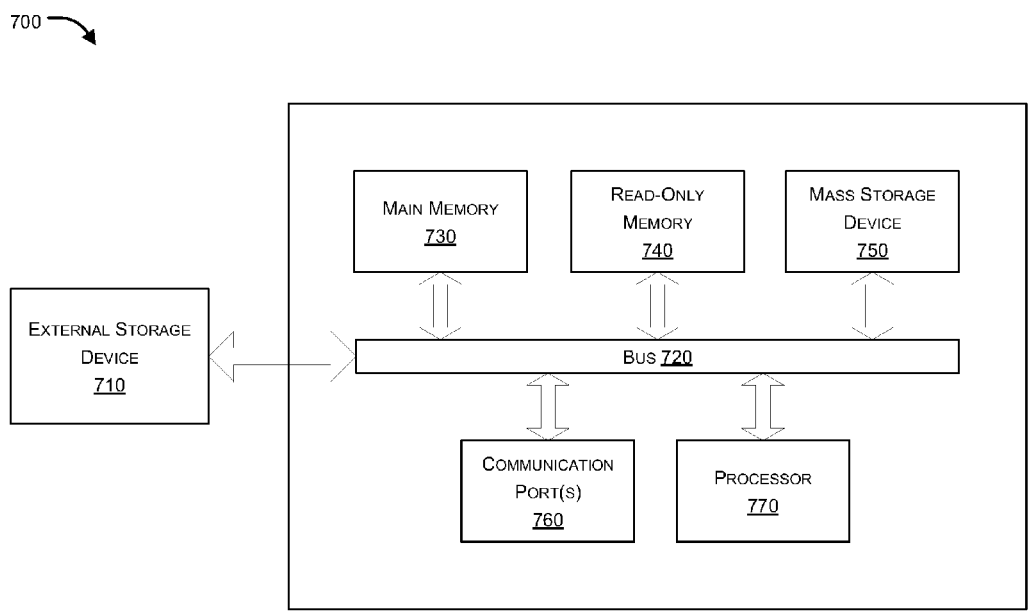
FIG. 7 is a block diagram of an exemplary computer system in which or with which embodiments of the present invention may be utilized.

FIG. 7 is a block diagram of an exemplary computer system 700 in which or with which embodiments of the present invention may be utilized. Computer system 700 may represent a network device (e.g., network device 104), an IDS or an IPS (e.g., IDS or IPS 200 or IDS system 402) or a metadata signature filtering and pre-match optimization system of an IDS or an IPS (e.g., metadata signature filtering and pre-match optimization system 300).

Embodiments of the present disclosure include various steps, which have been described in detail above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

According to the present example, the computer system includes a data bus 710, at least one processor 720, at least one communication port 730, a main memory 740, a removable storage media 750, a read only memory 760, and a mass storage 770. Processor(s) 720 can be any know processor, such as, but not limited to, an Intel® Itanium® or Itanium 2® processor(s), or AMD® Opteron® or Athlon MP® processor(s), or Motorola® lines of processors. Communication port(s) 730 can be any of an RS-232 port for use with a modem based dialup connection, a 10/100 Ethernet port, or a Gigabit port using copper or fiber. Communication port(s) 730 may be chosen depending on a network such a Local Area Network (LAN), Wide Area Network (WAN), or any network to which the computer system 700 connects.

Main memory 740 can be Random Access Memory (RAM), or any other dynamic storage device(s) commonly known in the art. Read only memory 760 can be any static storage device(s) such as Programmable Read Only Memory (PROM) chips for storing static information such as instructions for processor 720. Mass storage 770 can be used to store information and instructions. For example, hard disks such as the Adaptec® family of SCSI drives, an optical disc, an array of disks such as RAID, such as the Adaptec family of RAID drives, or any other mass storage devices may be used. Data bus 710 communicatively couples processor(s) 720 with the other memory, storage and communication blocks. Data bus 710 can be a PCI/PCI-X or SCSI based system bus depending on the storage devices used. Removable storage media 750 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

The components described above are meant to exemplify some types of possibilities. In no way should the aforementioned examples limit the scope of the invention, as they are only exemplary embodiments.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

What is claimed is:

1. An intrusion detection system (IDS) comprising:
   a signature database comprising a plurality of full-feature match metadata signatures each represented in a form of a rule specifying conditions under which values of metadata attributes of a packet at issue are deemed to match all pre-defined values of a plurality of packet metadata attributes;
   a full feature match engine configured to perform full-feature match processing of a candidate packet within network traffic received by the IDS by evaluating one or more of the plurality of full-feature match metadata signatures against the candidate packet; and
   a pre-match engine that identifies the candidate packet for full match processing by the full feature match engine, the pre-match engine comprising:
     a metadata signature categorization module configured to categorize the plurality of full-feature match metadata signatures into one or more metadata signature categories based on characteristics of the plurality of full-feature match metadata signatures; and
     a hash key based metadata signature filtration module configured to identify a first set of metadata signatures by filtering the plurality of full-feature match metadata signatures, wherein the first set of metadata signatures form part of a hash key based metadata signature category representing those of the plurality of full-feature match metadata signatures for which a hash-key represents a first suitable pre-match condition for the pre-defined values of one or more first specific metadata attributes of the plurality of packet metadata attributes, wherein the hash key based metadata signature category forms part of the one or more metadata signature categories, and wherein each of the first set of metadata signatures is associated with a fixed unique hash key based on which the one or more first specific metadata attributes of respective metadata signatures of the first set of metadata signatures are matched with the received network traffic to identify the candidate packet.

2. The system of claim 1, wherein the system further comprises a range based metadata signature filtration module configured to identify a second set of metadata signatures by filtering the plurality of full-feature match metadata signatures, wherein the second set of metadata signatures form part of a range based metadata signature category representing those of the plurality of full-feature match metadata signatures for which a mapped value represents a second suitable pre-match condition for a range of the pre-defined values of one or more second specific metadata attributes of the plurality of packet metadata attributes, wherein the range based metadata signature category forms part of the one or more metadata signature categories, and wherein each of the second set of metadata signatures is associated with at least one range that is mapped to a corresponding/defined mapping value based on which the one or more second specific metadata attributes of respective metadata signatures of the second set of metadata signatures are matched with the received network traffic to identify the candidate packet.

3. The system of claim 2, wherein the range based metadata signature category comprises mixed range based metadata signatures and Hypertext Transport Protocol (HTTP) range based metadata signatures.

4. The system of claim 1, wherein the system further comprises a bit-mask based metadata signature filtration module configured to identify a third set of metadata signatures that form part of a bit-mask based metadata signature category representing those of the plurality of full-feature match metadata signatures for which one or more bit-mask operations represents a third suitable pre-match condition for the pre-defined values of one or more third specific metadata attributes of the plurality of packet metadata attributes, wherein the bit-mask based metadata signature category forms part of the one or more metadata signature categories, and wherein each of the third set of metadata signatures is split into a plurality of parts to enable each part of the plurality of parts to be processed separately and independently by creating for each of the third set of metadata signatures a bit mask representing results of comparing the plurality of parts to corresponding parts of packets of the received network traffic to identify the candidate packet.

5. The system of claim 4, wherein the bit-mask based metadata signature category comprises Internet Protocol (IP) address based metadata signatures.

6. The system of claim 4, wherein after creating the bit mask, a logical AND operation is performed on each bit of the bit mask to determine a final match outcome for a bit-mask based metadata signature at issue of the third set of metadata signatures.

7. The system of claim 1, wherein the plurality of metadata signatures are based on any or a combination of source port based conditions, destination port based conditions, packet size based conditions, packet sequence number based conditions, special service type based conditions, special service protocol based conditions, Transmission Control Protocol (TCP) flag based conditions, IP address based conditions, and packet header information based conditions.

8. The system of claim 1, wherein the hash key based metadata signature category comprises protocol information based metadata signatures, service based metadata signatures, fixed port based metadata signatures, and other fixed type metadata signatures.

9. The system of claim 8, wherein the other fixed type metadata signatures are further divided into one or a combination of fixed remote procedure call (RPC) number based metadata signatures, fixed TCP flag based metadata signatures, fixed IP option based metadata signatures, fixed Internet Control Message Protocol (ICMP) type based metadata signatures, fixed service type based metadata signatures, fixed file type based metadata signatures, fixed Hypertext Transport Protocol (HTTP) type based metadata signatures, fixed miscellaneous type based metadata signatures, and fixed key based metadata signatures.

10. The system of claim 1, wherein the system further supports filtration and matching of a plurality of conditions expressed alternatively and that form part of one or more of the plurality of metadata signatures.

11. A method comprising:
configuring a signature database of an intrusion detection system (IDS) or an intrusion prevention system (IPS) with a plurality of full-feature match metadata signatures each represented in a form of a rule specifying conditions under which values of metadata attributes of a packet at issue are deemed to match all pre-defined values of a plurality of packet metadata attributes;
identifying, by a pre-match engine of the IDS or the IPS, a candidate packet of network traffic received by the IDS or the IPS for full-feature match processing by:
categorizing the plurality of full-feature match metadata signatures into one or more metadata signature categories based on characteristics of the plurality of full-feature match metadata signatures; and
identifying a first set of metadata signatures by filtering the plurality of full-feature match metadata signatures, wherein the first set of metadata signatures form part of a hash key based metadata signature category representing those of the plurality of full-feature match metadata signatures for which a hash-key represents a first suitable pre-match condition for the pre-defined values of one or more first specific metadata attributes of the plurality of packet metadata attributes, wherein the hash key based metadata signature category forms part of the one or more metadata signature categories, and wherein each of the first set of metadata signatures is associated with a fixed unique hash key based on which the one or more first specific metadata attributes of respective metadata signatures of the first set of metadata signatures are matched with the received network traffic to identify the candidate packet; and
identifying a potential intrusion by performing, by a full-feature match engine of the IDS or the IPS, the full-feature match processing on the candidate packet by evaluating one or more full-feature match metadata signatures against the candidate packet.

12. The method of claim 11, wherein the method further comprises identifying a second set of metadata signatures by filtering the plurality of full-feature match metadata signatures, wherein the second set of metadata signatures form part of a range based metadata signature category representing those of the plurality of full-feature match metadata signatures for which a mapped value represents a second suitable pre-match condition for a range of the pre-defined values of one or more second specific metadata attributes of the plurality of packet metadata attributes, wherein the range based metadata signature category forms part of the one or more metadata signature categories, and wherein each of the second set of metadata signatures is associated with at least one range that is mapped to a corresponding/defined mapping value based on which the one or more second specific metadata attributes of respective metadata signatures of the second set of metadata signatures are matched with the received network traffic to identify the candidate packet.

13. The method of claim 12, wherein the range based metadata signature category comprises mixed range based metadata signatures, and Hypertext Transport Protocol (HTTP) range based metadata signatures.

14. The method of claim 11, wherein the method further comprises identify a third set of metadata signatures that form part of a bit-mask based metadata signature category representing those of the plurality of full-feature match metadata signatures for which one or more bit-mask operations represents a third suitable pre-match condition for the pre-defined values of one or more third specific metadata attributes of the plurality of packet metadata attributes, wherein the bit-mask based metadata signature category forms part of the one or more metadata signature categories, and wherein each of the third set of metadata signatures is split into a plurality of parts to enable each part of the plurality of parts to be processed separately and independently by creating for each of the third set of metadata signatures a bit mask representing results of comparing the plurality of parts to corresponding parts of packets of the received network traffic to identify the candidate packet.

15. The method of claim 14, wherein the bit-mask based metadata signature category comprises Internet Protocol (IP) address based metadata signatures.

16. The method of claim 14, wherein after creating the bit mask, a logical AND operation is performed on each bit of the bit mask to determine a final match outcome for a bit-mask based metadata signature at issue of the third set of metadata signatures.

17. The method of claim 11, wherein the plurality of metadata signatures are based on any or a combination of source port based conditions, destination port based conditions, packet size based conditions, packet sequence number based conditions, special service type based conditions, special service protocol based conditions, Transmission Control Protocol (TCP) flag based conditions, IP address based conditions, and packet header information based conditions.

18. The method of claim 11, wherein the hash key based metadata signature category comprises protocol information based metadata signatures, service based metadata signatures, fixed port based metadata signatures, and other fixed type metadata signatures.

19. The method of claim 18, wherein the other fixed type metadata signatures are further divided into one or a combination of fixed remote procedure call (RPC) number based metadata signatures, fixed TCP flag based metadata signatures, fixed IP option based metadata signatures, fixed Internet Control Message Protocol (ICMP) type based metadata signatures, fixed service type based metadata signatures, fixed file type based metadata signatures, fixed Hypertext Transport Protocol (HTTP) type based metadata signatures, fixed miscellaneous type based metadata signatures, and fixed key based metadata signatures.

* * * * *